United States Patent [19]

Nagata et al.

[11] 4,358,226
[45] Nov. 9, 1982

[54] METHOD FOR CONVEYING ARTICLES BY AIR FLOW AND APPARATUS FOR WITHDRAWING CONVEYED ARTICLES

[75] Inventors: Seigo Nagata, Yaizu; Iwao Saito, Shimizu, both of Japan

[73] Assignee: Daiwa Can Company, Ltd., Japan

[21] Appl. No.: 125,479

[22] Filed: Feb. 28, 1980

[51] Int. Cl.$^3$ .............................................. B65G 51/02
[52] U.S. Cl. ........................................ 406/82; 198/690; 406/84; 406/93; 406/153
[58] Field of Search ............... 406/82, 77, 154, 93–95, 406/83, 84, 153; 198/690; 271/18.1, 18.2, 193

[56] References Cited

U.S. PATENT DOCUMENTS 3,272,313 9/1966 Sarovich .......................... 198/690 X
3,332,724 7/1967 Doucet ................................. 406/82
3,995,910 12/1976 Atwell ................................. 406/82

FOREIGN PATENT DOCUMENTS 1200392 12/1959 France ................................. 406/82

Primary Examiner—Jeffrey V. Nase
Attorney, Agent, or Firm—Daley & Brandt

[57] ABSTRACT

A method for conveying articles comprises sucking a first article to be conveyed into a conveyor pipe by utilizing a negative pressure caused by a first air flow, and discharging the first air flow from an intermediate portion of the conveyor pipe and at the same time sucking a second article to be conveyed into the pipe, while lowering the speed of the conveyed first article leaving the conveyor pipe by utilizing a second air flow having a smaller flow rate than that of the first air flow, and an apparatus for receiving and transporting an article conveyed by the above method comprises a window provided at the remaining portion of the upper end part of the conveyor pipe, and a belt conveyor placed just above the upper end part and having an elastic member and magnets.

6 Claims, 5 Drawing Figures

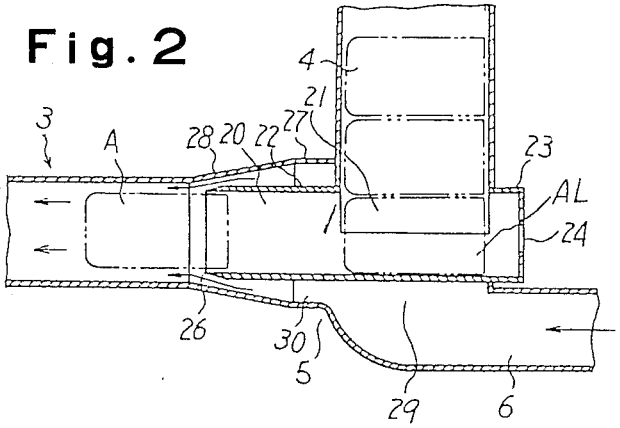
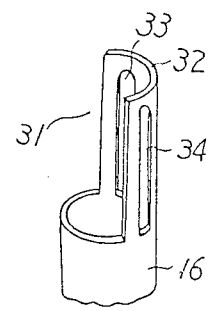
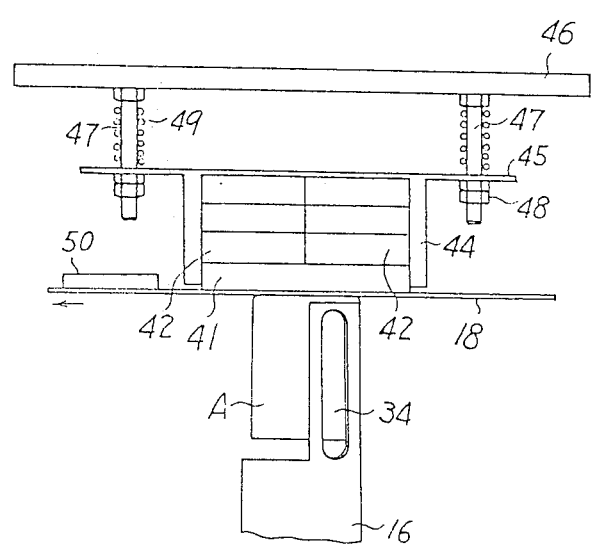

METHOD FOR CONVEYING ARTICLES BY AIR FLOW AND APPARATUS FOR WITHDRAWING CONVEYED ARTICLES

BACKGROUND OF THE INVENTION

This invention relates to a method for conveying articles such as empty cans made from thin metal sheet through a conduit to a successive step at a high speed at appropriate intervals by air flow, and also to an apparatus for conveying the articles through the conduit by air flow, receiving the conveyed articles from the conduit and transporting them horizontally.

An apparatus for conveying articles through a conduit by air flow as shown in FIG. 5 is well known, wherein an article to be conveyed is sucked into a conveyor conduit by suction of injected air and then blown upwards, and a blowing pressure in the conduit acts upon a suction inlet for a succeeding article while the preceding article is still in the conduit, and the succeeding article is not placed in the conveyor conduit by suction of injected air, but is sucked into the conduit by suction when the preceding article is discharged from the conduit. More particularly, an L-shaped inlet duct 61 is provided at the lower end of a vertical conveyor duct 60. The bottom wall of the inlet duct 61 is perpendicular or somewhat upwardly inclined to the conveyor duct, and a charge chute 63 is connected to the inlet duct 61 and is somewhat downwardly inclined to the conveyor duct. A blower nozzle 62 is provided at the bottom wall of the L-shaped inlet duct, and connected to a blower. A back flow hole 64 is provided at the joint of the inlet duct 61 and the charge chute 63. A valve 65 is pivotally provided at the upper side of the inlet duct 61 and prevented from movement toward the outside by a stopper 66.

When an article C to be conveyed is moved down to the dotted line position by rolling, the article is placed into the conveyor duct 60 by suction of air injected from the nozzle 62, and then blown upwards. While the article C is still in the duct 60, a reaction or back pressure of a pushing force against the article C exists in the conduit, and consequently the valve 65 is returned to the full line position in turn, restricting the back flow of air and preventing the conveying pressure in the duct, and at the same time a portion of back flow air passes through the valve 65 and is exhausted through the back flow hole 64, and thus there is no suction through the inlet duct. That is, a back pressure acts upon the succeeding article D, thereby stopping the movement of the article D. When the article C is discharged from the duct 60, there is no back flow, and the suction acts again, so that the article D is automatically charged. Thus, a predetermined amount of articles can be always exactly charged into the conveyor duct by one motion by changing the length of the inlet duct 61 appropriately.

However, said apparatus cannot suck the succeeding article to be conveyed, until the preceding article has been discharged from the duct, and thus numbers of the articles to be conveyed in unit time will be disadvantageously limited.

SUMMARY OF THE INVENTION

An object of the present invention is to provide a method for sucking a succeeding article into a conduit when a preceding article exists in said conduit and conveying articles separately one by one at appropriate intervals through a long conduit by air flow.

When articles susceptible to easy deformation by impact such as empty cans made from a thin metal sheet are conveyed through a conduit by air flow, it is necessary to receive the articles conveyed at a high speed from a conveyor conduit without any damage to the articles, and transport them rapidly to a successive step.

Another object of the present invention is to provide an apparatus for conveying the articles through the conduit by air flow, receiving the conveyed articles from the conduit and transporting them horizontally, which comprises a means for reducing the speed of the conveyed article in discharging from the conveyor conduit and a means for receiving the conveyed article without any damage and rapidly transporting the received article.

The present invention provides a method for conveying articles by air flow, which comprises sucking an article from a small cylinder containing articles to be conveyed into a conveyor conduit by suction attained by a first air flow passing along the outer periphery of the small cylinder and in an axial direction of the small cylinder, conveying the article through the conduit at a predetermined distance by the first air flow, exhausting most of the first air flow from an intermediate portion of the conduit to the outside of the conduit during said conveyance, thereby substantially releasing the force of reaction of the first air flow upon the small cylinder, further conveying the article through the conduit by a second air flow at a lower flow rate than that of the first air flow, exhausting most of the second air flow to the outside of the conduit just before the end of the conduit, thereby lowering the conveying speed of the article, discharging the article from the conduit, and transporting the discharged article to a successive step.

The present invention further provides an apparatus for conveying an article by air flow, receiving the article from the conduit onto a belt conveyor and transporting it horizontally, which comprives a vertical pipe constituting a conveyor conduit and the belt conveyor provided near the upper end part of the vertical pipe and in a horizontal direction, about one-half of the upper end part being cut away in a vertical direction at the side of the belt advancing direction, the remaining portion of the upper end part being provided with a window, the belt conveyor being provided with an elastic member having a larger surface than the surface of the article at the side to be in contact with a belt above the belt just above the upper end part of the vertical pipe, a member capable of attracting the article to the belt through the elastic member being provided above the elastic member, and members capable of attracting the article at predetermined positions on the belt near the elastic member and in the belt advancing direction.

BRIEF DESCRIPTION OF THE DRAWINGS

FIG. 2 is a cross-sectional view showing a part of placing empty cans into a conveyor pipe.

FIG. 3 is a schematic view showing the upper end part of the conveyor pipe.

FIG. 4 is a view showing the upper end part of the conveyor pipe and the structure of a conveyor at that part.

DETAILED DESCRIPTION OF PREFERRED EMBODIMENTS

The present invention will be described in detail below, referring to a case of conveying empty cans.

Figure 1:
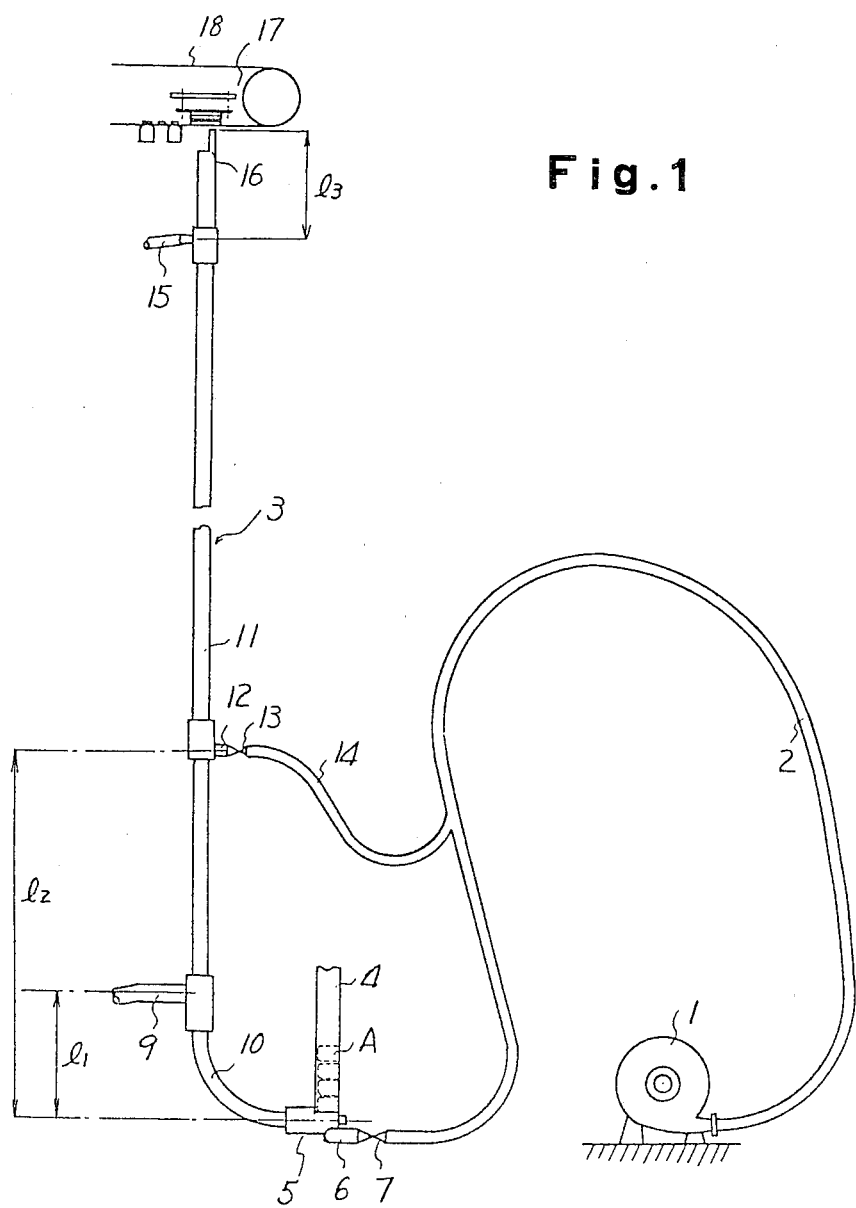
FIG. 1 is a layout view showing the main parts of an apparatus for conveying empty cans according to the present method.
Figure 5:
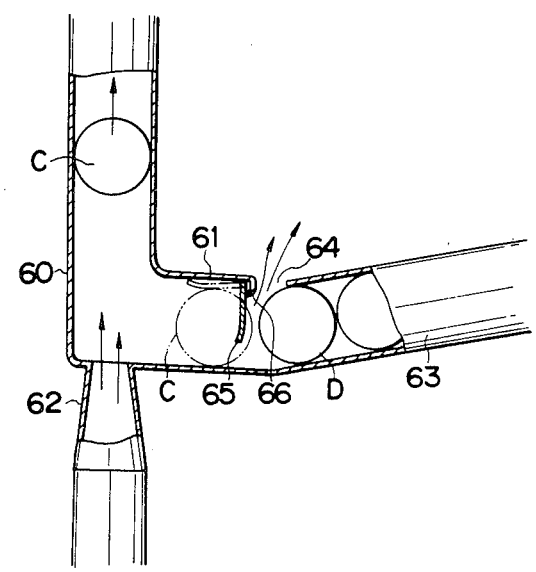
FIG. 5 is a cross-sectional side view showing the essential parts of a conventional apparatus for conveying an article by air flow.

FIG. 1 shows an apparatus for elevating empty cans with bottoms, about 53 mm in diameter and about 120 mm high, to a level at a vertical distance of about 7 m by air flow, wherein numeral 1 is a blower having a blowing capacity of 8 m$^3$/minute, 2 is a first flexible hose, 75 mm in diameter, for sending air from blower 1 to an empty can-conveying conduit, 3 is a conveyor pipe comprised of a horizontal lower end part 5, a vertical part 11 and an arc part 10 connecting the lower end part 5 to the vertical part 11 and having an outer diameter of about 76 mm, 4 is a can guide frame vertically connected to the lower end part 5 of the conveyor pipe 3 and directed to placing the empty cans A into the lower end part 5, 6 is a first air flow inlet part for introducing air into the lower end part 5, 7 is a first valve provided between the inlet part 6 and the first hose 2, 9 is a first exhaust pipe provided between a second air flow inlet part 12, and the lower end part 5 below the vertical part 11 of the conveyor pipe 3, 12 is the second air flow inlet part provided at the intermediate position of the vertical part 11 of the conveyor pipe 3, 13 is a second valve of the second air flow inlet part 12, 14 is a second hose, about 50 mm in diameter, connecting the second valve 13 to the first hose for sending the air, 15 is a second exhaust pipe below the upper end part 16 of the vertical part 11 of the conveyor pipe 3, and 17 is a conveyor located near the upper end part 16 and provided with a horizontally movable belt 18.

In this embodiment of the present invention the height $l_1$ from the level of the lower end part 5 to the level of the first exhaust pipe 9 is 90 cm, the height $l_2$ from the level of the lower end part 5 to the second inlet part 12 is 250 cm, and the length $l_3$ from the upper end edge of the conveyor pipe 3 to the second exhaust pipe 15 is 70 cm.

In the can guide cylinder 4, empty cans A are placed one upon another, while letting the open sides of the cans be at the right side on the drawing. The empty can AL at the lowest position in the can guide cylinder 4 is in a small cylinder 20 provided horizontally and communicated with the can guide cylinder 4, as shown in FIG. 2. The small cylinder 20 is just below the can guide cylinder 4, and is comprised of a can-inserting part 21, a front guide pipe 22 extending from the insertion part 21 toward the conveyor pipe 3, and a back empty pipe chamber 23 at the side opposite to the front guide pipe 22, and an air hole 24 is provided at the end wall of the back empty pipe chamber 23. The inner diameter of the small cylinder 20 is a little larger than the diameter of the can A.

The small cylinder 20 is integrated with the conveyor pipe 3 and surrounded by an outer air guide wall 27 comprising a cylindrical part communicating with the first air flow inlet part 6. The outer air guide wall 27 is gradually reduced in its diameter toward the conveyor pipe 3 to make a funnel-like part 28, and the minimum diameter part of the funnel-like part 28 is located at the conveyor pipe side from the front end edge 26 of the small cylinder 20.

Since the empty can suction section is in such a structure as described above, the air flow from the blower 1 passes through the first hose 2, the first valve 7, the first air flow inlet part 6 and an opening 29 and enters into a chamber 30 surrounded by the outer air guide wall 27, goes around the small cylinder 20, and goes to the conveyor pipe 3 from the periphery of the front end edge 26 of the small cylinder 20, whereby the front part of the can or the front guide pipe part is brought under a negative pressure in the small cylinder 20, whereas the air hole 24 is provided at the end wall of the back empty pipe chamber 23, and thus the empty can AL is sucked forward to the conveyor pipe 3. After the empty can is made to further advance and leave the small cylinder 20, it can be made to go through the conveyor pipe at a high speed by air flow. That is, the empty can goes through the conveyor pipe 3 from the lower end part 5 to the arc part 10, successively to the vertical part 11 and over the second air flow inlet part by the first air flow, while the bottom of the empty can being at the front side. Since the empty can has been already passed over the first exhaust pipe 9 by that time, most of the first air flow is exhausted through the first exhaust pipe 9 to the outside of the conveyor pipe 3, and the back force of the first air flow so far dominant in the small cylinder 20 is no more effective thereby. Thus, another can is withdrawn from the small cylinder 20 by suction in the manner as described above.

The empty can having passed over the second air flow inlet part 12 is made to go upwards through the remaining portion of the vertical part 11 of the conveyor pipe 3 by the second air flow introduced at the second air flow inlet part. The diameter of the second hose 14 is smaller than that of the first hose 2, and thus the flow rate of the second air flow is lower than that of the first air flow.

Since the second exhaust pipe 15 is provided just before the upper end part 16 of the vertical part 11 in the present apparatus, empty can reaches the upper end part while reducing the ascending speed of the empty can having passed over the second exhaust pipe.

As shown in FIGS. 3 and 4, about one-half of the upper end part 16 is cut away at the side in the belt-moving direction (shown by an arrow mark in FIG. 4), so that the empty can sent through the conveyor pipe 3 while keeping the bottom of the empty can upside can be withdrawn for the cut-away side of the upper end part in a horizontal direction. The cut-away part is shown as 31 in FIG. 3, and the remaining part 32 of the upper end part has a plurality of windows, for example, 33 and 34.

The empty can is withdrawn from the cut-away part 31 in a direction perpendicular to the vertical conveyor pipe 3, that is, in a horizontal direction. The windows 33 and 34 are provided to prevent the empty can from inclination caused by a negative pressure differential, if any, between the remaining part 32 and the side wall of the empty can if there were no windows at the withdrawal of the empty can, and from the resulting failure of conveyor transportation.

In order to transport the empty can having reached the cut-away part 31 of the upper end part 16 on the belt 18 of conveyor 17, the conveyor 17 is provided with an elastic member 41 having a broader contact surface than the bottom surface of the empty can and a magnet 42 which is placed just above the upper end part 16 and upon the elastic member 41 in a support frame 44, and which the empty can hits through the belt 18, as shown in FIG. 4. The support frame 44 is fixed to a fixed plate 45, which is, in turn, elastically suspended at a fixed plate 46 by bolts 47, nuts 48 and spring 49. Numeral 50 is another magnet capable of attracting the empty can toward the belt 18 and moving the empty can together with the belt 18.

The empty can having been vertically sent through the conveyor pipe 3 hits the belt 18 at a considerably high speed, usually 15-20 m/sec. The empty can repeats motions of leaving the belt by reaction of impact and hitting the belt again for some duration. However, when more than 200 empty cans per minute must be conveyed through the conveyor pipe 3, it is well possible that the succeeding empty can ascends and hits the preceding can which is undergoing said repeated motions, and these two cans can be damaged.

The magnet 42 is to reduce the upward and downward motions of the empty can and the elastic member 41 is formed so as to absorb most of the kinetic energy of the empty can at the hitting.

When such an elastic member 41 is provided, there is a distance corresponding to the thickness of elastic member 41 between the empty can and the magnet 42 to attract the empty can, and thus it is natural to use a magnet having a power capable of attracting the empty can against such a distance.

Such a structure as described above can rapidly and assuredly attract and transport even such an empty can that ascends and hits the belt at a considerably high speed.

In the foregoing embodiments, the magnet is used as a means for attracting an empty can to a conveyor, but when an article to be conveyed is non-magnetic, a vacuum-suction means must be used in place of the magnet.

The present method can convey articles to be conveyed through a conveyor pipe at appropriate intervals by sucking an article to be conveyed into the conveyor pipe by utilizing a negative pressure caused by a first air flow, and exhausting the first air flow from the conveyor pipe, thereby releasing a force of reaction in conveying the article by air flow, and placing another article into the conveyor pipe, and also can lower the speed of the article to be discharged from the conveyor pipe by using a second air flow at a lower flow rate than that of the first air flow and exhausting most of the second air flow before discharging the article from the discharge pipe, and thereby preventing deformation and damage of the article.

Since a window is provided at the remaining portion of the upper end part of the conveyor pipe in the present apparatus, the article to be conveyed can leave the upper end part without any resistance when the article is moved in a direction perpendicular to the conveyor pipe, and also since an elastic member is provided above a belt at the position which the article hits, the article can be prevented from damage or deformation thereby together with said reduction in speed when the article leaves the upper part.

It will be apparent that various changes in form and details can be made to the method and apparatus of the invention without departing from the spirit and scope thereof, the forms hereinbefore described being merely preferred embodiments thereof.

What is claimed is:

1. Apparatus for conveying articles between first and second locations, said apparatus comprising an elongated conduit extending between said two locations and having an inlet thereto at said first location and outlet therefrom at said second location, means for positioning a vertically superposed stack of articles at said first location, first air flow supply means for introducing an air flow into the inlet of said conduit, said positioning means being disposed relative to said conduit such that the lowermost article in the stack is aligned with said inlet, said introduced air being operable to draw said lowermost article into said conduit and transport it therein toward said conduit outlet, means for exhausting air flow from said conduit at a third location downstream of said inlet whereby back pressure within said conduit upstream of said third location and existing by presence of said article in said conduit is released with continuing introduction of air flow into said inlet being operable to draw the next stack article which is aligned with said inlet into said conduit, second air flow supply means for introducing a second air flow into said conduit at a fourth location downstream of said third location to therewith further transport the first article toward said conduit outlet, second air flow exhausting means in said conduit at a fifth location downstream of said fourth location for exhausting air flow from said conduit whereby the air flow transport force acting on the first article when situated between the second air flow exhausting means location and the conduit outlet is diminished to thereby reduce the speed at which said first article approaches said outlet, and flexible impact means disposed across the conduit outlet against which the first article impacts upon discharge thereof from said conduit, said flexible impact means embodying article attraction means operable to attract an article discharging from said conduit towards said impact means, said conduit being disposed in a generally vertically directed orientation with the inlet thereto at the lower end and the outlet therefrom at the upper end, said apparatus further comprising a transport unit located at the upper end of said conduit and including a transport belt traversing a generally horizontal travel course passing closely adjacent the conduit outlet and intervening said outlet and said flexible impact means, said transport belt having article holding means thereon for retentively holding thereagainst an article discharging from said conduit whereby advance of the belt away from said outlet transports held articles to a further location.

2. The apparatus of claim 1 in which the articles are of a magnetically attractable type material, and said attraction means is a magnet.

3. The apparatus of claim 1 in which the articles are of a magnetically attractable type material, and said belt holding means comprises magnets carried on said belt.

4. The apparatus of claim 1 in which an upper tip end portion of said conduit has a cut away part at the side of the transport belt advance direction through which a belt held article is moved as the belt travels away from the conduit outlet, the remainder part of said tip end portion having at least one window therein for inhibiting the effect of negative pressure differential between said article and said remainder part.

5. The apparatus of claim 1 in which said first air flow supply means and said second air flow supply means are connected with a common air blower unit, there being separate air hoses for communicating air flow from said blower unit to said conduit inlet and to said fourth location, the respective hoses having valved connection with said conduit, the flow rate of air introduced with said second air flow supply means to said conduit being less than that introduced with said first air flow supply means.

6. The apparatus of claim 1 in which said article positioning means includes a frame member receptive of a vertical stack of superposed articles and fitted at its lower end with a guide pipe in which the lowermost article in the stack is received, said pipe being aligned with said conduit inlet, said guide pipe being encircled by a guide wall connected to said conduit inlet end, the space between said guide wall and said guide pipe being in communication with said first air flow supply means and said conduit inlet whereby air flow through said space and into said conduit inlet produces negative pressure in said guide pipe in front of said lowermost article and thereby drawing of said lowermost article into said conduit.

* * * * *